United States Patent

Kohn et al.

[11] Patent Number: 6,068,900
[45] Date of Patent: May 30, 2000

[54] PLASTIC CONTAINER HAVING A HIGH RESISTANCE TO CHEMICAL ATTACK AND METHOD OF MAKING SAME

[75] Inventors: Udo Kohn, Darmstadt; Franz Steigerwald, Griesheim, both of Germany

[73] Assignee: Wella AG, Darmstadt, Germany

[21] Appl. No.: 09/029,725

[22] PCT Filed: Jul. 4, 1997

[86] PCT No.: PCT/EP97/03543

§ 371 Date: Feb. 27, 1998

§ 102(e) Date: Feb. 27, 1998

[87] PCT Pub. No.: WO98/01347

PCT Pub. Date: Jan. 15, 1998

[30] Foreign Application Priority Data

Jul. 5, 1996 [DE] Germany .......................... 196 27 226

[51] Int. Cl.[7] .............................. B65D 1/02; B29C 49/04; B29C 49/22
[52] U.S. Cl. ..................... 428/35.7; 428/213; 428/343; 428/542.8; 220/62.12; 220/62.22; 215/347; 215/12.2; 264/515
[58] Field of Search .................... 428/36.9, 36.91, 428/480, 524, 542.8, 35.7, 213, 156, 343, 351, 352, 354; 264/515, 454, 464; 215/12.1, 12.2, 232, 379, 347, 349, 351, 352, 348; 220/660, 62.12, 62.22

[56] References Cited

U.S. PATENT DOCUMENTS

| 5,628,957 | 5/1997 | Collette et al. ...................... 264/512 |
| 5,772,056 | 6/1998 | Slat ................................. 215/12.2 |

FOREIGN PATENT DOCUMENTS

| 306820A1 | 3/1989 | European Pat. Off. . |
| 0365266 | 10/1989 | European Pat. Off. . |
| 4415549 | 11/1995 | Germany . |
| WO95/07219 | 3/1995 | WIPO . |
| WO95/16554 | 6/1995 | WIPO . |

*Primary Examiner*—Ellis Robinson
*Assistant Examiner*—John J. Figueroa
*Attorney, Agent, or Firm*—Michael J. Striker

[57] ABSTRACT

A plastic container has a high resistance to chemical attack and is made by a method including extruding and inflating a tube in a single operation by a coextrusion blow molding process to form a hollow plastic body. The tube consists of an outer layer made of glycol-modified polyethylene terephthalate (PETG) and an inner layer made of polyethylene terephthalate (PET), polyethylene naphthalate (PEN) or a mixture thereof. Selection of the foregoing materials and layers allows the plastic body for the container to be made in a single operation by coextrusion blow molding.

6 Claims, 1 Drawing Sheet

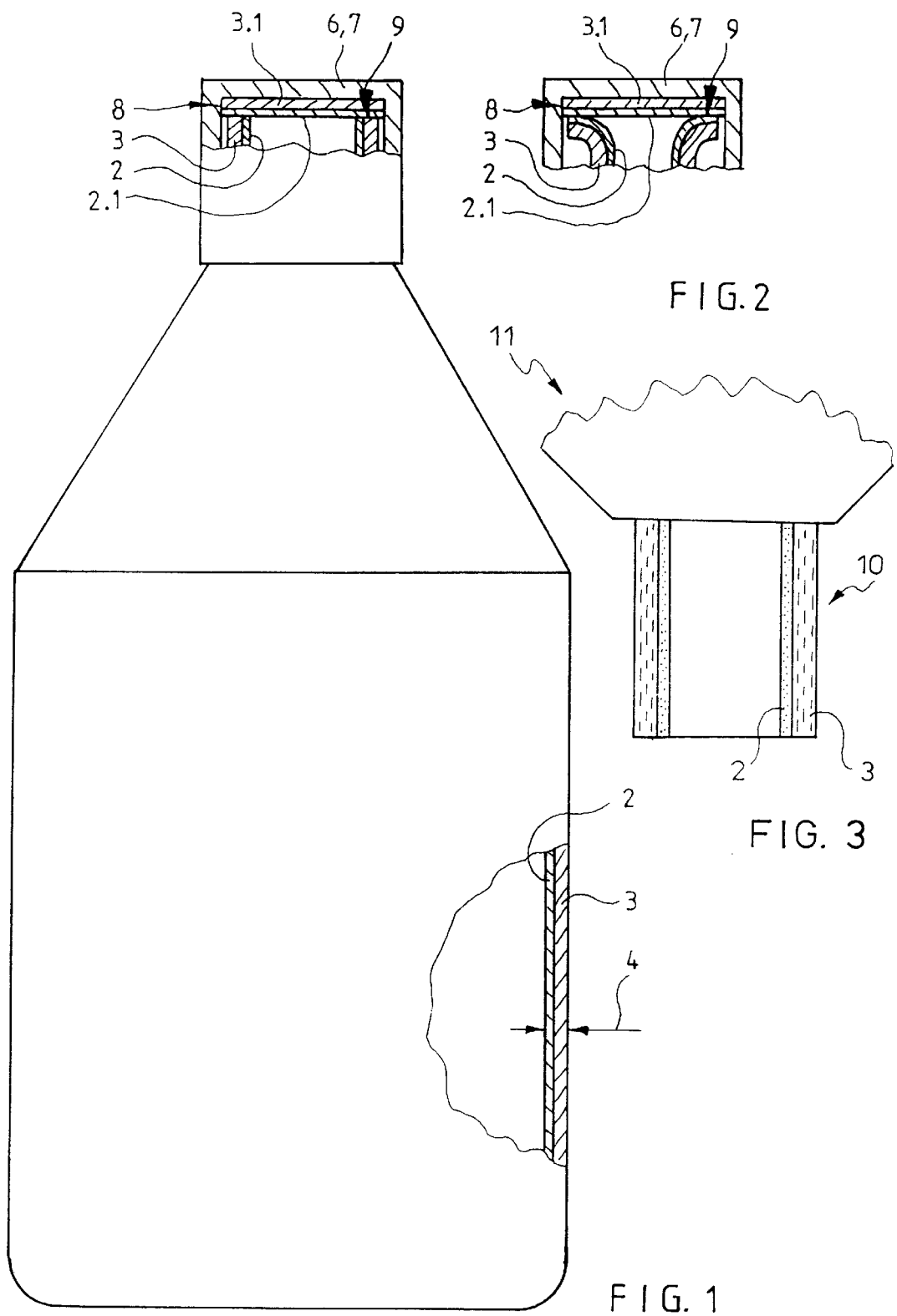

PLASTIC CONTAINER HAVING A HIGH RESISTANCE TO CHEMICAL ATTACK AND METHOD OF MAKING SAME

BACKGROUND OF THE INVENTION

1. Field of the Invention

The invention relates to a plastic container of a high resistance to chemical attack and to a method for producing a the plastic container.

2. Prior Art

The fundamental problem exists of furnishing an inexpensive, easy-to-use plastic container with high chemical resistance and a highly protective effect against oxygen for oxygen-vulnerable products to be contained, such as permanent-waving preparations based on ammonium thioglycolate, hair dyes with ammonia or monoethanolamine, temporary hair colorings with direct-drawing pigments based on emulsions, cosmetic hair products with alcohol in a proportion of greater than 30%, and cosmetic hair products with a low pH of less than 4.

It is true that (extrusion blow molded) hollow bodies of PVC with high chemical resistance are known, but they are deficient in their ecological properties and limitations in certain recyling processes. In addition, (extrusion blow molded) hollow bodies of modified polyethylene terephthalate (PET) are known. From glycol modification, for instance, these modified polyesters have a higher melt viscosity, to lend them adequate tube stability for the extrusion blow molding process. When this material is used for the above products to be contained, however, a chemical attack takes place, which can lead to embrittlement, clouding, softening, and stress cracks.

Using pure polyethylene terephthalate (PET) is possible only in those blow molding processes in which the preform can be made by injection molding, since the melt viscosity is too low for processing by extrusion blow molding. Although there is indeed chemical resistance, nevertheless because of the injection blow molding process, developing and realizing a hollow body of this kind entails major investment for tools, long development lead times, major effort if the shape of weight of the hollow bodies is to be changed, and high production runs of at least 1 million pieces per year, because of the commercial requirements of the process.

In contrast to PET, using polyethylene naphthalate (PEN) also provides high chemical resistance against hair dyes, but even PEN has to be processed by injection blow molding, and thus has all the disadvantages named above for PET.

The use of multilayer hollow bodies based on polyolefins, such as PE/PA, is also possible, but with the following disadvantages: swelling of the PE, pigment creepage into the PE, problems with the welding seams in the hollow body, and the fact that adequate transparency if needed cannot be attained. The process is also expensive, because of the three layers and the adhesion promoter that has to be used.

From German Patent Disclosure DE 44 15 549 A1, an extrusion blow molded three-layer hollow body is known whose layers (from the inside out) comprise PETG, adhesion promoter and polyolefin. Only a water vapor barrier and a creepage barrier are achieved here. The disadvantages of the three-layer process, as described above, still pertain. Transparent containers cannot be produced. Nor is adequate chemical resistance achieved.

In addition, extrusion blow molded two-layer hollow bodies are known, which comprise two materials with affinity for one another, selected from the same group of materials, and which therefore require no adhesion promoter. These hollow bodies are used for instance when making a glossy layer on polyolefin bodies. In that case the main wall is blown from a nonglossy polyolefin with high melt viscosity, and a glossy layer of the same or similar material with low melt viscosity is then applied by the coextrusion blow molding process.

SUMMARY OF THE INVENTION

The object of the invention is to provide an improved plastic container having a high resistance to chemical attack, which has a highly protective effect against oxygen for oxygen-vulnerable products to be contained, and which is ecologically unproblematic and can be produced economically.

It is also an object of the prevent invention to provide an improved method of making a plastic container having a high resistance to chemical attack, which is more economical than prior art methods and in which dimensional changes are easier to make.

According the invention the economical method of making a plastic container includes extruding and inflating a tube in a single operation by a coextrusion blow molding process to form a hollow plastic body, wherein the tube consists of an outer layer and an inner layer. The outer layer consists of glycol-modified polyethylene terephthalate (PETG) and the inner layer consists of polyethylene terephthalate (PET), polyethylene naphthalate (PEN) or a mixture thereof.

The plastic container of the invention comprises a hollow plastic body consisting of an inner layer and an outer layer. The outer layer is glycol-modified polyethylene terephthalate (PETG) and the inner layer consists of polyethylene terephthalate (PET), polyethylene naphthalate (PEN) or a mixture thereof.

In other words, this involves a two-layer hollow body with a base layer of extrusion blow moldable modified PET, preferably glycol-modified PETG with high melt viscosity, with sufficient melt strength to allow the extrusion of a hanging tube, and with an inner protective layer of a material of higher chemical resistance that adheres well to the tube and is selected from the group of polyester materials of the same affinity comprising unmodified PET, a mixture of PET and PEN, or PEN of low melt viscosity.

As a result of this embodiment, the advantages of PVC without its disadvantages are attained; specifically, a chemically resistant, oxygen-impermeable hollow body is available that is ecologically unproblematic, easily recycled, and optionally transparent and glossy, and that at the same time makes economical production possible even for lower production runs, at low tool cost, with short production times and easy variability of the dimensions of the hollow body (shaping) and adjustment of the weight (wall thickness).

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a side view of an exemplary embodiment with a releasable closure;

FIG. 2 is a refinement of the function of the closure; and

FIG. 3 is an extruded, hanging tube as a preform.

DESCRIPTION OF THE PREFERRED EMBODIMENT

In FIG. 1, a hollow plastic body 1 which has an inner layer 2 and an outer layer 3 is shown. The outer layer 3 comprises modified polyethylene terephthalate (PET), preferably glycol-modified polyethylene terephthalate (PETG), and the inner layer 2 comprises polyethylene terephthalate (PET) or polyethylene naphthalate (PEN) or a mixture of polyethylene terephthalate and polyethylene naphthalate. Preferably, the outer layer 3 makes up a proportion of more than 50% of the total layer thickness 4, and the inner layer 2 makes up a proportion of less than 50%. In this exemplary embodiment, the hollow body 1 is embodied as a bottle 5, which is provided with a closure 6. As the closure 6, a twist-off cap, not shown, or a re-releasable closure 7 (screw top, snap-type or hinged closure) may be provided. A good sealing property of the releasable closure 7 is obtained by providing the closure with a sealing layer 8, which comprises an identical or similar inner layer 2 and outer layer 3 and is optionally elastic in shape (for instance by means of a suitable additional coating or a disk), for the sake of better form-locking pressing against a rim 9 of the bottleneck. The result is very good sealing properties, because the inner layer 2 of the bottle 5 is in force-locking engagement with the inner layer 2.1 of the sealing layer 8 of the releasable closure 7.

An advantageous refinement of the closure function is shown in FIG. 2, in which the rim 9 of the bottleneck is embodied as flangelike or trumpet-like, in such a way that the inner layer 2 of the bottle is in force-locking engagement with the inner layer 2.1 of the sealing layer 8 of the releasable closure 7 over a relatively large surface area, the result of which is even an better sealing property.

FIG. 3, in a sectional view, shows a hanging tube 10 extruded from an extruder 11. It is clear from this illustration that despite the low melt viscosity of PET, the inner layer 2 is joined in laminar fashion to the inner surface of the outer layer 3, or as if glued to it, and thus the outer layer 3 functions as a supporting layer for the inner layer 2, since the outer layer 3, for instance because of PETG, has a higher viscosity and thus increased melt strength. For the first time, this makes it possible to employ a conventional economical extrusion blow molding process, since the time elapsed between the extrusion and the blow molding is so short that the inner layer 2 is essentially incapable of spreading (downward) along the inside of the outer layer 3.

The method for producing hollow plastic bodies 1 with an inner layer 2 and an outer layer 3 by an extrusion blow molding process is distinguished in that the outer layer 3, comprising modified polyethylene terephthalate (PET), and the inner layer 2, comprising polyethylene terephthalate (PET) or polyethylene naphthalate (PEN) or a mixture of polyethylene terephthalate and polyethylene naphthalate, are put together in a single operation in the production process by a coextrusion blow molding process and are extruded and inflated in the form of a tube 10; preferably a glycol-modified polyethylene terephthalate (PETG) is provided. Until the blow molding process begins, the tube 10 hangs essentially freely.

List of Reference Numerals

1 Hollow plastic body
3, 2.1 inner layer
3, 3.1 Outer layer
4 Total layer thickness
5 Bottle
6 Closure
7 Releasable closure
8 Sealing layer
9 Rim of the bottleneck
10 Tube
11 Extruder

We claim:

1. A plastic container that is resistant to chemical attack, said plastic container being made by a method comprising coextrusion blow molding of a hollow plastic body (1) in a single operation and said plastic container comprising said hollow plastic body (1), wherein said hollow plastic body consists of an inner layer (2) and an outer layer (3), the outer layer (3) consists of glycol-modified polyethylene terephthalate (PETG) and the inner layer (2) consists of polyethylene terephthalate (PET), polyethylene naphthalate (PEN) or a mixture thereof.

2. The plastic container as defined in claim 1, wherein said hollow plastic body has a total layer thickness, said outer layer (3) has an outer layer thickness, said inner layer (2) has an inner layer thickness and said outer layer thickness is more than 50% of said total layer thickness while said inner layer thickness is less than 50% of said total layer thickness.

3. The plastic container as defined in claim 1, further comprising a closure (6,7) for said hollow plastic body, and wherein said hollow plastic body is embodied as a bottle (5).

4. The plastic container as defined in claim 3, wherein said closure (6,7) is releasable and includes a sealing layer (8), said sealing layer (8) comprising an inner closure layer (2.1) and an outer closure layer (3.1).

5. A method of making a plastic container, said method comprising extruding and inflating a tube in a single operation by a coextrusion blow molding process to form a hollow plastic body, said tube consisting of an outer layer and an inner layer, and wherein said outer layer consists of glycol-modified polyethylene terephthalate (PETG) and wherein said inner layer consists of polyethylene terephthalate (PET), polyethylene naphthalate (PEN) or a mixture thereof.

6. The method as defined in claim 5, wherein said tube is freely hanging during said coextrusion blow molding process.

* * * * *